US010392006B2

(12) United States Patent
Schwarz

(10) Patent No.: US 10,392,006 B2
(45) Date of Patent: Aug. 27, 2019

(54) OPERATION OF A HYBRID VEHICLE AFTER DETECTING THAT A LOWER FUEL FILLING LEVEL HAS BEEN REACHED OR UNDERSHOT

(71) Applicant: Bayerische Motoren Werke Aktiengesellschaft, Munich (DE)

(72) Inventor: Johannes Schwarz, Unterschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 74 days.

(21) Appl. No.: 15/816,592

(22) Filed: Nov. 17, 2017

(65) Prior Publication Data
US 2018/0093661 A1 Apr. 5, 2018

Related U.S. Application Data

(63) Continuation of application No. PCT/EP2016/060014, filed on May 4, 2016.

(30) Foreign Application Priority Data

May 20, 2015 (DE) .................. 10 2015 209 248

(51) Int. Cl.
*B60K 6/48* (2007.10)
*B60L 58/12* (2019.01)
(Continued)

(52) U.S. Cl.
CPC ............... *B60W 20/50* (2013.01); *B60K 6/48* (2013.01); *B60L 58/12* (2019.02); *B60W 10/04* (2013.01);
(Continued)

(58) Field of Classification Search
CPC ...... B60W 20/50; B60W 10/04; B60W 20/10; B60W 2710/06; B60W 2710/08;
(Continued)

(56) References Cited

U.S. PATENT DOCUMENTS 6,488,609 B1 * 12/2002 Morimoto ............... B60K 6/40
477/181
9,050,976 B2 6/2015 Krauss et al.
(Continued)

FOREIGN PATENT DOCUMENTS

CN 103998306 A 8/2014
DE 199 02 949 A1 8/2000
(Continued)

OTHER PUBLICATIONS

PCT/EP2016/060014, International Search Report dated Jul. 13, 2016 (Two (2) pages).
(Continued)

*Primary Examiner* — Russell Frejd
(74) *Attorney, Agent, or Firm* — Crowell & Moring LLP

(57) ABSTRACT

A method for operating a hybrid vehicle having an internal combustion engine and an electrical machine for driving the hybrid vehicle is provided, where the internal combustion engine is supplied with fuel from a fuel tank, a fuel filling level of the fuel tank being determined using a fuel filling level sensor, wherein the electrical machine is supplied with electrical energy from an energy store, and the vehicle is configured to be driven in a purely electric mode, with the internal combustion engine switched off, using the electrical machine. In certain embodiments, the method includes establishing that the fuel filling level sensor indicates that a lower filling level has been reached or undershot, and, in response to this establishing, switching off the internal combustion engine and driving the vehicle in the purely
(Continued)

electric mode, with the internal combustion engine switched off, using the electrical machine. Following said driving the vehicle in the purely electric mode of the vehicle, the method further includes switching on the internal combustion engine and driving the vehicle using the internal combustion engine in a special mode with the internal combustion engine switched on when one or more conditions for the special mode are satisfied.

19 Claims, 2 Drawing Sheets

(51) Int. Cl.
  *B60W 10/04* (2006.01)
  *B60W 20/10* (2016.01)
  *B60W 20/50* (2016.01)
(52) U.S. Cl.
  CPC ....... *B60W 20/10* (2013.01); *B60W 2510/244* (2013.01); *B60W 2510/246* (2013.01); *B60W 2540/04* (2013.01); *B60W 2540/06* (2013.01); *B60W 2560/02* (2013.01); *B60W 2710/06* (2013.01); *B60W 2710/08* (2013.01); *Y02T 10/6221* (2013.01); *Y10S 903/93* (2013.01)
(58) Field of Classification Search
  CPC ......... B60W 2540/06; B60W 2540/04; B60W 2510/246; B60W 2510/244; B60W 2560/02; B60L 58/12; B60K 6/48; Y10S 903/93; Y02T 10/6221
  See application file for complete search history.

(56) References Cited

U.S. PATENT DOCUMENTS

| | | | | |
|---|---|---|---|---|
| 2008/0209886 A1* | 9/2008 | Zillmer | ............ | B60K 6/48 60/277 |
| 2009/0146615 A1* | 6/2009 | Zillmer | ............ | B60K 6/48 322/23 |
| 2010/0170733 A1* | 7/2010 | Marcacci | ............ | B60K 6/38 180/65.265 |
| 2012/0061163 A1* | 3/2012 | Musser | ............ | B60W 10/06 180/333 |
| 2012/0123666 A1* | 5/2012 | Stoffels | ............ | F01M 1/02 701/113 |
| 2014/0229091 A1* | 8/2014 | Larsson | ............ | F02N 11/0833 701/113 |

FOREIGN PATENT DOCUMENTS

| | | |
|---|---|---|
| DE | 100 38 128 A1 | 3/2001 |
| DE | 10 2009 008 273 A1 | 8/2010 |
| DE | 10 2012 108 485 A1 | 3/2014 |
| JP | 2009-12593 A | 1/2009 |
| JP | 2014-113945 A | 6/2014 |
| WO | WO 2013/154094 A1 | 10/2013 |

OTHER PUBLICATIONS

German Office Action issued in German counterpart application No. 10 2015 209 248.8 dated Apr. 14, 2016 (Three (3) pages).
Chinese Notification of First Office Action issued in Chinese counterpart application No. 201680011369.X dated Feb. 3, 2019 (Three (3) pages).

* cited by examiner

US 10,392,006 B2

OPERATION OF A HYBRID VEHICLE AFTER DETECTING THAT A LOWER FUEL FILLING LEVEL HAS BEEN REACHED OR UNDERSHOT

CROSS REFERENCE TO RELATED APPLICATIONS

This application is a continuation of PCT International Application No. PCT/EP2016/060014, filed May 4, 2016, which claims priority under 35 U.S.C. § 119 from German Patent Application No. 10 2015 209 248.8, filed May 20, 2015, the entire disclosures of which are herein expressly incorporated by reference.

BACKGROUND AND SUMMARY OF THE INVENTION

The invention relates to a method for operating a hybrid vehicle comprising an internal combustion engine and an electrical machine for driving the vehicle, and also to a control device, which corresponds to the method, for controlling the operation of a hybrid vehicle.

In a hybrid vehicle of this kind, the internal combustion engine is supplied with fuel (for example gasoline or diesel) from a fuel tank, wherein the fuel filling level of the fuel tank is determined using a fuel filling level sensor. The electrical machine is supplied with electrical energy from an energy store (for example a battery or a capacitor).

The vehicle can be driven in the purely electric mode, with the internal combustion engine switched off, by means of the electrical machine.

Document DE 10 2012 108 485 A1 discloses a method for operating a hybrid vehicle comprising an internal combustion engine and an electrical machine, wherein the hybrid vehicle can be driven in a purely electric manner by means of the electrical machine when the fuel tank for supplying fuel to the internal combustion engine is empty. When the internal combustion engine fails when the fuel tank is empty, continued driving of the hybrid vehicle in a purely electric manner is possible only under the condition that restarting of the hybrid vehicle is initiated by the driver. To this end, the ignition of the internal combustion engine is preferably first switched off and then switched on again.

In the case of a hybrid vehicle of this kind, depending on the design of the fuel filling level sensor, the sensor cannot detect a certain residual quantity of fuel in the tank and it is indicated to the drive control system that the fuel tank is already empty even though a certain quantity of fuel is still present. When the sensor signals an empty tank, the internal combustion engine is shut off and the vehicle is only driven in the purely electric mode using the electric motor until the state of charge (SOC) of the energy store of the electric drive has fallen to such an extent that the vehicle can no longer be driven in the purely electric mode either. For as long as the vehicle is not refueled with a certain minimum quantity of fuel and the filling level does not reach a specific minimum level again (for example at least 5 l of fuel), the drive control system prevents restarting of the internal combustion engine, while the vehicle cannot be driven by means of the electrical machine for as long as the state of charge of the energy store is too low.

A manner of operation of this kind has the disadvantage that the vehicle can no longer move when it is indicated that the fuel tank is empty and when the state of charge of the electrical energy store is too low, even though there is still a sufficient residual fuel in the tank to move a certain distance, for example in order to reach a gas station or an electrical charging station. In the event of an emergency situation or a hazardous situation, it could be of great importance to still use this residual quantity of fuel in the tank and to still operate the vehicle by means of the internal combustion engine for a certain residual running distance.

Furthermore, it is disadvantageous that, in the event of a fuel tank that has run to empty, the driver, when refueling, can fill considerably less fuel into the tank than expected, for example only 42 liters instead of a specified tank volume of 45 liters. This may lead to the driver becoming irritated since the driver expects to be able to run the tank to completely empty.

An object of the invention is to specify an operating method, which is improved in relation to the above, for operating a hybrid vehicle and a correspondingly improved control device for controlling the operation of a hybrid vehicle in which residual fuel in the tank can still be used.

This object may be achieved by the features of the independent patent claims. Advantageous embodiments are described in the dependent claims. It should be noted that additional features of a patent claim which is dependent on an independent patent claim can form an invention on its own and independently of the combination of all of the features of the independent patent claim without the features of the independent patent claim or only in combination with some of the features of the independent patent claim, which invention can be made part of the subject matter of an independent claim, a divisional application or subsequent application. This applies in the same way to technical teachings which are described in the description and can form an invention which is independent of the features of the independent patent claims.

A first aspect of the invention relates to a method for operating a hybrid vehicle comprising an internal combustion engine and an electrical machine for driving the hybrid vehicle. The hybrid vehicle is typically a so-called parallel hybrid in which both the electrical machine and the internal combustion engine act on the drive train; in this case, it can also be provided, for example, that the internal combustion engine and the electrical machine act on different vehicle axles (this is also called an axle hybrid). The hybrid vehicle is preferably a plug-in hybrid vehicle, wherein the energy store of the electric drive can be charged externally by means of a power supply system.

The internal combustion engine is supplied with fuel (for example gasoline or diesel) from a fuel tank, wherein the fuel filling level of the fuel tank is determined using a fuel filling level sensor. The fuel filling level sensor may be, for example, a sensor which measures the filling level directly, for example a fuel filling level sensor with a float of which the vertical height can be measured (for example in the form of an electrical resistor which is related to the vertical height). As an alternative, a fuel filling level sensor which operates by means of throughflow sensors would also be conceivable: in this case, the drawn and added quantity of fuel is measured and the filling level is calculated from this.

The electrical machine is supplied with electrical energy from an energy store (for example from a battery or a capacitor). The vehicle supports a purely electric mode, in which the vehicle is driven by means of the electrical machine with the internal combustion engine switched off.

According to the method, it is first established that the fuel filling level sensor indicates that a lower filling level has been reached or undershot. The lower filling level preferably corresponds to an empty fuel tank, wherein, in this case, it is established that fuel filling level sensor indicates an empty fuel tank. As already stated at the outset, in spite of a fuel tank being indicated as empty, there is however typically still a certain quantity of fuel in the tank. However, the method according to the invention is not restricted to the case of a fuel tank which has been identified as empty by the fuel sensor.

In response to this, the internal combustion engine is switched off and the vehicle is driven in the purely electric mode, with the internal combustion engine switched off, by means of the electrical machine. When the internal combustion engine is switched off, the driver is preferably provided with an, in particular optical, warning message, for example that an internal combustion engine-operated range is no longer available.

The method according to the invention is characterized in that, after a purely electric mode of the vehicle (for example until the driver stops the vehicle on account of a lack of electrical operating capability or the vehicle breaks down), the internal combustion engine is switched on again and the vehicle is driven by means of the internal combustion engine in the special mode with the internal combustion engine switched on, provided that one condition for the special mode are satisfied. There may also be a plurality of conditions which all have to be satisfied so that the internal combustion engine can be switched on and the vehicle can be driven in the special mode by means of the internal combustion engine.

When the one or the several conditions for the special mode are present, the method according to the invention therefore allows the internal combustion engine to be restarted and the remaining residual fuel to be used in the special mode, for example in order to reach a gas station.

Since the residual fuel can be at least partially, preferably completely used, irritation of the driver when refueling is avoided since, when refueling, the driver is aware of the residual quantity of force still located in the tank (this can be approximately zero under certain circumstances during refueling) which corresponds, together with the quantity of fuel with which the tank is filled, to the specified tank volume of the vehicle.

The method according to the invention is not restricted to the case of a fuel tank which has been identified as empty by the fuel sensor, but rather could also be used when the internal combustion engine is switched off, for example when a lower filling level of 1 liter of fuel which is detected by the sensor is undershot, so that the vehicle is driven in the purely electric mode. According to the invention, the remaining residual fuel (for example 1 liter) can be at least partially used later when the internal combustion engine is switched off if the one or more conditions for the special mode are satisfied. The lower filling level preferably corresponds to a value of 0 to 2 liters of fuel, for example 0 liter or 1 liter.

Operating situations for the special mode, in which an internal combustion engine is not operated, are conceivable. For example, it may be the case that the internal combustion engine is not operated in the special mode when traveling downhill.

The one or more conditions for the special mode can comprise the condition that restarting of the hybrid vehicle by the driver is established in the vehicle. Restarting is triggered, for example, by means of an operator control action by the driver for switching off the ignition and by means of a subsequent operator control action by the driver for switching on the ignition, for example by first operation of a start/stop button for switch off and a second operation of the start/stop button for switch on; this sequence of the start/stop button is registered by the vehicle. Switch on and switch off of the ignition is also called a terminal change.

Therefore, if the driver triggers a terminal change, for example in the event of a lack of operational capability of the electric drive (for example in the case of breakdown), a special mode of the vehicle can be triggered as a result when the internal combustion engine is switched on.

In addition or as an alternative, the one or more conditions for the special mode can comprise at least one operating parameter of the electric drive, which is related to the operational capability of the electric drive, satisfying a criterion for reduced operational capability of the electric drive. For example, a condition for the special mode can be that the state of charge (SOC) is less than or less than or equal to a specific threshold value for the charge level.

For example, when the vehicle is restarted, a check can be made in respect of whether the charge level is less than or less than or equal to the threshold value for the charge level. If this is the case, the special mode is activated. Otherwise, the purely electric mode is activated for example.

A special mode is ended and the internal combustion engine is turned off when, preferably, a component diagnosis function establishes a lack of fuel and preferably requests the internal combustion engine be turned off on account of a lack of fuel. For example, the diagnosis function of the fuel high-pressure pump establishes that there is no longer any fuel, and therefore it requests the internal combustion engine be switched off. The internal combustion engine can therefore still be operated using the residual fuel for as long as possible, until virtually no more fuel is available.

A second aspect of the invention relates to a control device for controlling the operation of a hybrid vehicle comprising an internal combustion engine and an electrical machine for driving the hybrid vehicle. The control device is designed to establish that the fuel filling level sensor indicates that a lower filling level has been reached or undershot, and, in response to this, to trigger switch off of the internal combustion engine and driving of the vehicle in the purely electric mode, with the internal combustion engine switched off, by means of the electrical machine. The control device is characterized in that, after the purely electric mode of the vehicle, the control device is designed to trigger switch on of the internal combustion engine and driving of the vehicle by means of the internal combustion engine in the special mode with the internal combustion engine switched on, provided that one or more conditions for the special mode are satisfied.

The above statements relating to the method according to the invention in accordance with the first aspect of the invention apply in a corresponding manner to the control device according to the invention in accordance with the second aspect of the invention too. Advantageous exemplary embodiments of the control device according to the invention which are not explicitly described at this point and in the patent claims correspond to the advantageous exemplary embodiments of the method according to the invention described above or described in the patent claims.

Other objects, advantages and novel features of the present invention will become apparent from the following detailed description of one or more preferred embodiments when considered in conjunction with the accompanying drawings.

BRIEF DESCRIPTION OF THE DRAWINGS

The invention will be described below on the basis of an exemplary embodiment with the aid of the appended drawings, in which.

DETAILED DESCRIPTION OF THE DRAWINGS

Figure 1:
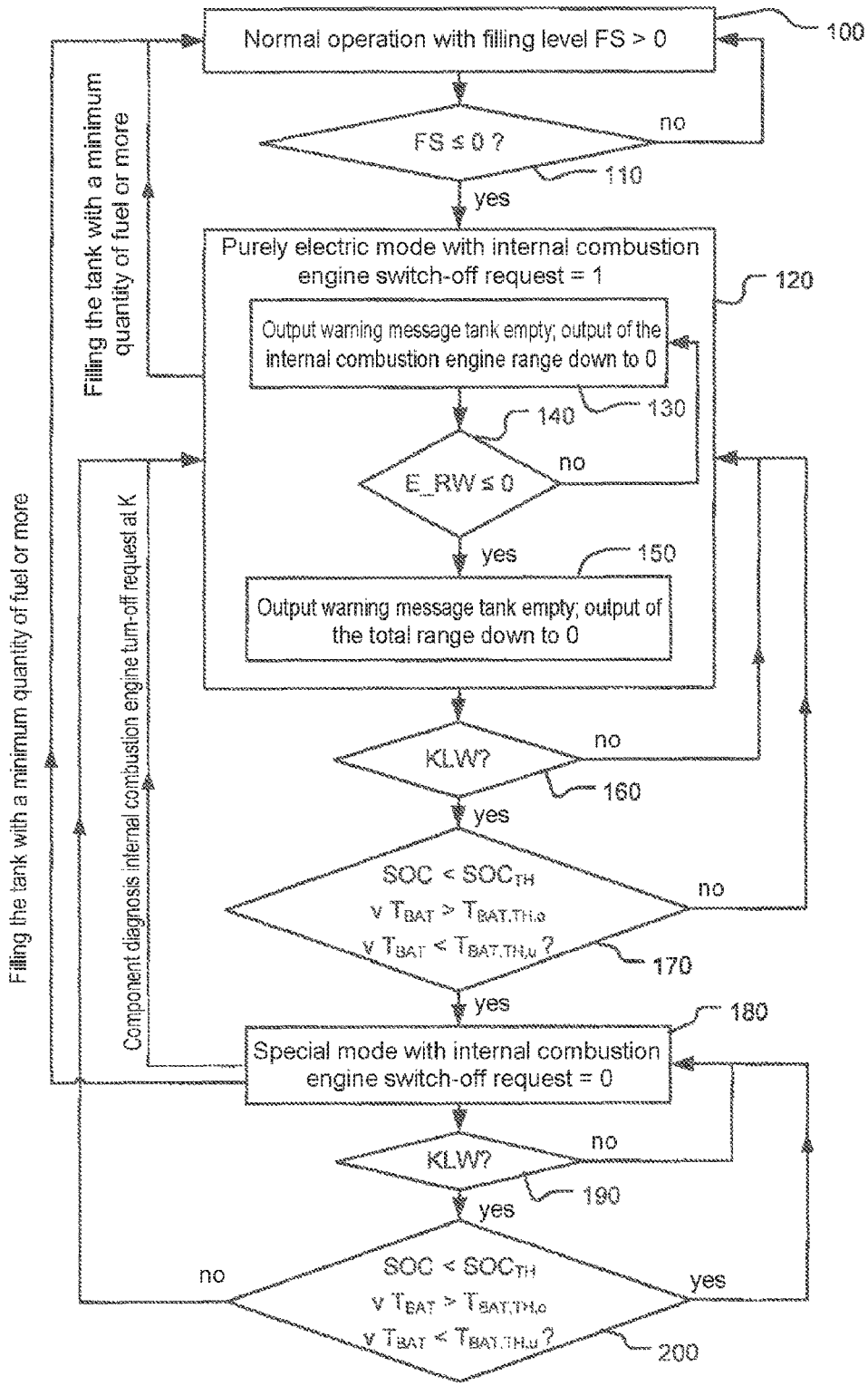
FIG. 1 shows an exemplary embodiment of an operating method according to the invention for operating a hybrid vehicle.

FIG. 1 illustrates an exemplary embodiment of an operating method according to the invention for operating a hybrid vehicle. Reference numeral 100 identifies the normal mode. In the normal mode 100, the vehicle can be driven in parallel by means of an internal combustion engine and an electrical machine (hybrid operating mode), by means of the internal combustion engine alone (internal combustion engine-operated operating mode) or by means of the electrical machine (electrical operating mode) alone. The choice as to which of these three operating modes the vehicle is driven in the normal operating state 100 is made by a hybrid operating strategy, for example depending on the drive torque currently requested by the driver by way of the accelerator pedal. In the normal mode 100, the filling level FS, which is measured by means of a filling level sensor, of the fuel in the fuel tank is continuously monitored. In the check 110, a check is made as to whether the currently measured filling level FS is less than or equal to the value 0, that is to say a check is made as to whether the fuel sensor indicates an empty fuel tank. If this is not the case, the vehicle remains in the normal mode 100.

If the measured filling level indicates an empty fuel tank (FS≤0), the vehicle changes over to a purely electric forced mode 120 in which the internal combustion engine necessarily has to be switched off. During the changeover to the purely electric forced mode 120, a switch-off request for switching off the internal combustion engine is output to the engine control device of the internal combustion engine by the binary variable internal combustion engine switch-off request being set to 1. If the internal combustion engine was switched on before the changeover to the purely electric forced mode 120, said internal combustion engine is then switched off, so that the vehicle is driven by the electrical machine without assistance by the internal combustion engine. In the purely electric forced mode, only the electrical machine for driving the vehicle is necessarily used, in contrast to the normal mode 100. An optical warning message, which signals that the fuel tank is empty (see step 130), is output by means of the instrument combination in the vehicle cockpit when the changeover is made from the normal operating state 100 to the purely electric forced mode 120. Furthermore, the instrument combination indicates that the range VM_RW which can still be covered with internal combustion engine operation is zero. Furthermore, the range E_RW which can still be covered in a purely electric manner is further continuously calculated, for example depending on the state of charge of the vehicle battery and the electrical power requirement. If the range E_RW which can be covered in a purely electric manner is less than or equal to 0 (see the check 140), it is indicated in the instrument combination that the total range RW (where RW=VM_RW+E_RW) is zero (see step 150). The vehicle breaks down approximately at this time. At this point at the latest, or else already at any time before the vehicle breakdown, the driver can changeover from the purely electric forced mode 120 to a special mode 180 in which the internal combustion engine can again be used to drive the vehicle.

In order to change over to the special mode 180, the driver has to restart the vehicle by operating the motor start/motor stop button twice; this is also called a terminal change in the text which follows. The presence of a terminal change (abbreviated to KLW in FIG. 1) is regularly checked in step 160. If no terminal change is established, the vehicle remains in the purely electric forced operating mode 120. If a terminal change is established, a check is made in check 170 as to whether at least one of the operating parameters SOC and $T_{BAT}$, which are each related to the operational capability of the electric drive, satisfies a criterion for reduced operational capability of the electric drive. The operating parameter SOC indicates the state of charge SOC of the electric battery for supplying the electric drive machine; the operating parameter $T_{BAT}$ corresponds to the temperature of the electric battery.

If, when the vehicle is restarted, the state of charge SOC of the battery is less than a threshold value $SOC_{TH}$ or the battery temperature $T_{BAT}$ is outside the temperature window from the lower limit temperature $T_{BAT,TH,n}$ to the upper limit temperature $T_{BAT,TH,o}$ (see the check 170), in the event of an immediately previously triggered terminal change (see the check 160), the vehicle is switched over to the special mode 180 in which the internal combustion engine can be used to drive the vehicle again. The switch-off request for switching off the internal combustion engine is withdrawn by the binary variable internal combustion engine switch-off request being set to 0, so that the hybrid operating strategy can trigger switch on of the internal combustion engine in spite of FS≤0. The special mode does not always mean that the internal combustion engine is switched on; however, the operating strategy has the option of using the internal combustion engine for driving.

If the state of charge SOC of the battery is greater than or equal to the threshold value $SOC_{TH}$ and the battery temperature $T_{BAT}$ lies in the temperature window (see the check 170), the vehicle remains in the electrical forced mode 120 in spite of restarting by the driver.

The special mode 180 preferably corresponds substantially to the normal mode 100, with the difference that the charging power for charging the battery is limited in comparison to the normal mode 100. The charging power is preferably limited in such a way that the state of charge which can be shown to the driver by means of the instrument combination remains below a threshold below which an empty vehicle battery is indicated to the driver.

In the special mode, the hybrid operating strategy can start the internal combustion engine again, so that the vehicle can be driven, for example, to a gas station or to a charging station using the remaining fuel.

In the special mode 180, a plurality of component diagnosis functions of different components (independently of the fuel filling level sensor) monitor the presence of fuel in order to avoid damage when there is a lack of fuel; for example the diagnosis function of the fuel high-pressure pump or the diagnosis function of the catalyst. When one of the component diagnosis functions establishes that there is no longer any fuel, the component diagnosis function requests the internal combustion engine be switched off, so that the vehicle changes over from the special mode 180 to the electrical forced mode 120 again. For example, the diagnosis function of the fuel high-pressure pump establishes that no more fuel can be drawn in, and requests the internal combustion engine be switched off for component protection reasons.

By triggering a terminal change (see the check 190), a changeover can be made from the special mode 180 to the electrical forced mode 120 again if the state of charge SOC of the battery is greater than or equal to the threshold value $SOC_{TH}$ and the battery temperature $T_{BAT}$ lies in the temperature window (see the check 200 which corresponds to the check 170).

If, in the event of a terminal change, the state of charge SOC of the battery is less than the threshold value $SOC_{TH}$ or the battery temperature $T_{BAT}$ lies outside the temperature window from the lower limit temperature $T_{BAT,TH,u}$ to the upper limit temperature $T_{BAT,TH,o}$, the vehicle remains in the special mode 180.

A changeover is made both from the special mode 180 and from the purely electric forced mode 120 to the normal mode 100 when the tank is filled with a specific minimum quantity of fuel (for example 5 liters) or more.

Figure 2:
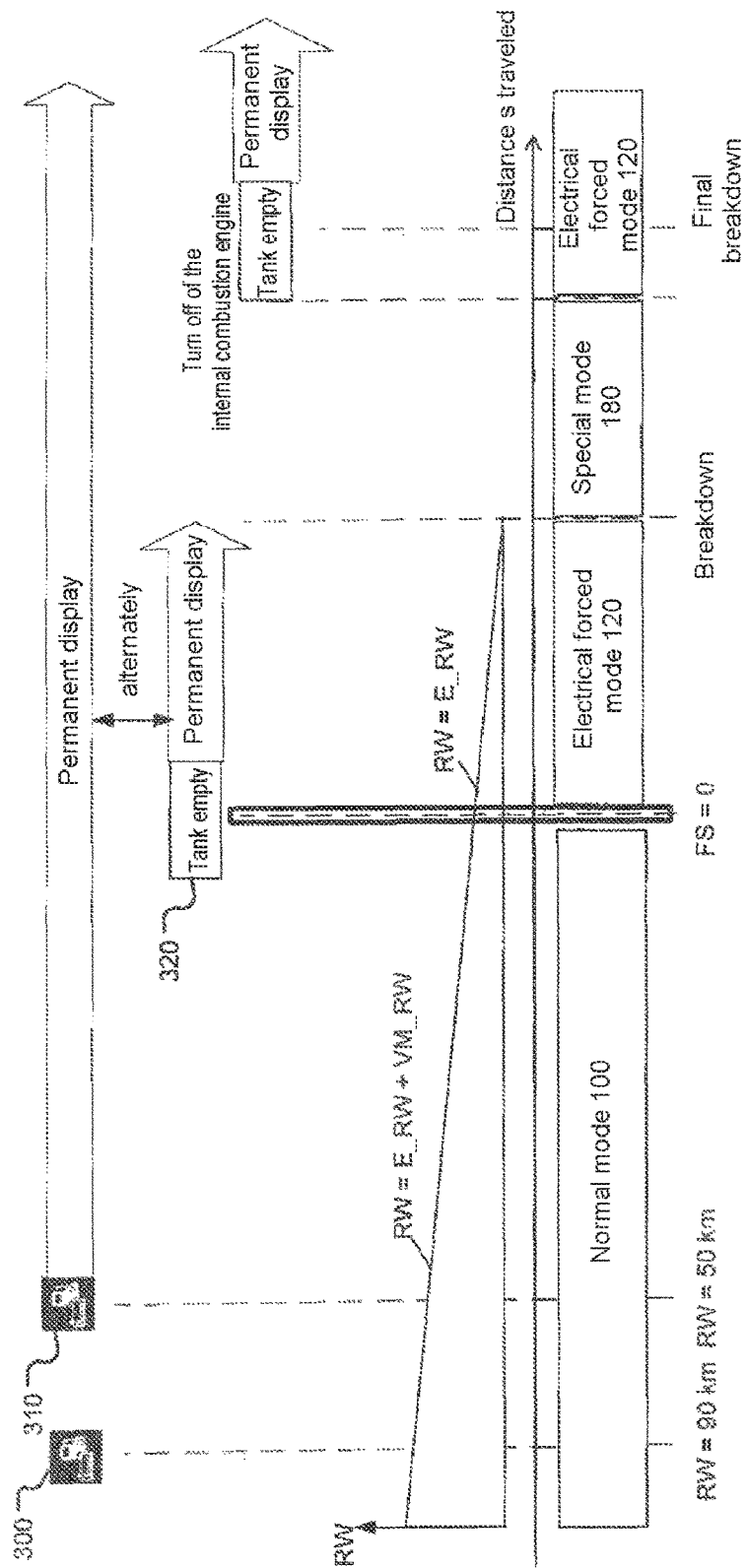
FIG. 2 shows an exemplary sequence of operating modes over the distance traveled.

FIG. 2 shows an exemplary sequence of operating modes of the hybrid vehicle in the lower region, the profile of the measured total range RW=E_RW+VM_RW illustrated in the instrument combination in the middle region, and the output of range warning messages over the distance s traveled in the upper region.

The vehicle is initially in the normal mode 100; the measured fuel filling level FS is greater than zero.

A first range warning 300 in the form of a pictogram in the instrument combination appears at a measured total range RW of, for example, 90 km.

A second range warning 310 in the form of a pictogram in the instrument combination appears at a measured total range RW of, for example, 50 km. In contrast to the first range warning 300, the pictogram is now permanently displayed and, in contrast to the first range warning 300, presented in a warning color, for example yellow. Furthermore, the total range RW is displayed in addition to the pictogram as part of the second range warning 310. Furthermore, a text message also appears in the instrument combination, said text message only disappearing after confirmation by the driver.

When the measured fuel filling level FS reaches zero, that is to say the tank is allegedly empty according to measurement, the vehicle changes over from the normal mode 100 to the electrical forced mode 120. Furthermore, a tank empty warning message 320, which indicates that the tank is empty, appears. This tank empty warning message 320 is permanently output alternately with the second range warning 310.

As the vehicle continues to travel in the electrical forced mode 120, the state of charge SOC of the vehicle battery continues to drop, so that the vehicle breaks down at a certain time. The total range RW has fallen to zero here.

If the driver then triggers a terminal change (or had already done so earlier) and one of the conditions from the check 170 is satisfied, the vehicle changes over to the special mode 180 in which the internal combustion engine can be used to drive the vehicle again, in order to reach a gas station for example.

If the tank of the vehicle is not filled in good time or is externally charged, the diagnosis function of the fuel high-pressure pump later establishes, for example, that no more fuel can be drawn, this leading to the internal combustion engine being turned off. The vehicle then changes over to the electrical forced mode 120 again. Owing to the special mode 180, the vehicle battery can be partially charged in the meantime, so that the vehicle can travel a short distance further in the electrical forced mode 120 before the vehicle finally breaks down if the vehicle is not externally electrically charged or refueled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a hybrid vehicle having an internal combustion engine and an electrical machine for driving the hybrid vehicle, wherein the internal combustion engine is supplied with fuel from a fuel tank, a fuel filling level of the fuel tank being determined using a fuel filling level sensor, wherein the electrical machine is supplied with electrical energy from an energy store, and the vehicle is configured to be driven in a purely electric mode, with the internal combustion engine switched off, using the electrical machine, wherein the method comprises:
    establishing that the fuel filling level sensor indicates that a lower filling level has been reached or undershot; and,
    in response to said establishing, switching off the internal combustion engine and driving the vehicle in the purely electric mode, with the internal combustion engine switched off, using the electrical machine,
    following said driving the vehicle in the purely electric mode of the vehicle, switching on the internal combustion engine and driving the vehicle using the internal combustion engine in a special mode with the internal combustion engine switched on when one or more conditions for the special mode are satisfied.

2. The method as claimed in claim 1, wherein the lower filling level corresponds to an empty fuel tank, and said establishing further comprises providing an indication, by the fuel filling level sensor, for the empty fuel tank.

3. The method as claimed in claim 1, wherein the one or more conditions for the special mode comprise restarting of the hybrid vehicle by the driver.

4. The method as claimed in claim 2, wherein the one or more conditions for the special mode comprise restarting of the hybrid vehicle by the driver.

5. The method as claimed in claim 3, wherein restarting of the hybrid vehicle by the driver comprises an operator control action by the driver for switching off the ignition and then an operator control action by the driver for switching on the ignition are established.

6. The method as claimed in claim 4, wherein restarting of the hybrid vehicle by the driver comprises an operator control action by the driver for switching off the ignition and then an operator control action by the driver for switching on the ignition are established.

7. The method as claimed in claim 1, wherein the one or more conditions for the special mode comprise at least one operating parameter of an electric drive, which comprises the electrical machine and the energy store, and wherein the at least one operating parameter is related to the operational capability of the electric drive satisfying a criterion for reduced operational capability of the electric drive.

8. The method as claimed in claim 5, wherein the one or more conditions for the special mode comprise at least one operating parameter of an electric drive, which comprises the electrical machine and the energy store, and wherein the at least one operating parameter is related to the operational capability of the electric drive satisfying a criterion for reduced operational capability of the electric drive.

9. The method as claimed in claim 7, wherein the at least one operating parameter of the electric drive comprises a state of charge of the energy store being less than or less than or equal to a prespecified threshold value.

10. The method as claimed in claim 8, wherein the at least one operating parameter of the electric drive comprises a state of charge of the energy store being less than or less than or equal to a prespecified threshold value.

11. The method as claimed in claim 1, wherein the one or more conditions for the special mode comprise:
   restarting of the hybrid vehicle by the driver, and
   at least one operating parameter of an electric drive, which comprises the electrical machine and the energy store, and wherein the at least one operating parameter is related to the operational capability of the electric drive satisfying a criterion for reduced operational capability of the electric drive.

12. The method as claimed in claim 11, wherein restarting by the driver is established and the at least one operating parameter does not satisfy the criterion for reduced operational capability of the electric drive, the special mode with the internal combustion engine switched on is not triggered and, instead, the vehicle is operated in the purely electric mode, with the internal combustion engine switched off, using the electrical machine.

13. The method as claimed in claim 1, further comprising ending the special mode when a component diagnosis function establishes a lack of fuel.

14. The method as claimed in claim 13, further comprising ending the special mode when the component diagnosis function requests the internal combustion engine be turned off on account of the lack of fuel.

15. The method as claimed in claim 1, wherein
   in the event of restarting of the hybrid vehicle by the driver after a previous special mode, the vehicle is again operated in the special mode when the internal combustion engine is switched on if it is established that an operating parameter of the electric drive, which comprises the electrical machine and the energy store, and is related to the operational capability of the electric drive satisfies a criterion for reduced operational capability of the electric drive, and
   in the event of restarting of the hybrid vehicle by the driver after the previous special mode, the vehicle is again operated in the purely electric mode when the internal combustion engine is switched on if it is established that the operating parameter of the electric drive which comprises the electrical machine and the energy store and is related to the operational capability of the electric drive does not satisfy the criterion for reduced operational capability of the electric drive.

16. The method as claimed in claim 3, wherein
   in the event of restarting of the hybrid vehicle by the driver after a previous special mode, the vehicle is again operated in the special mode when the internal combustion engine is switched on if it is established that an operating parameter of the electric drive, which comprises the electrical machine and the energy store, and is related to the operational capability of the electric drive satisfies a criterion for reduced operational capability of the electric drive, and
   in the event of restarting of the hybrid vehicle by the driver after the previous special mode, the vehicle is again operated in the purely electric mode when the internal combustion engine is switched on if it is established that the operating parameter of the electric drive which comprises the electrical machine and the energy store and is related to the operational capability of the electric drive does not satisfy the criterion for reduced operational capability of the electric drive.

17. The method as claimed in claim 5, wherein
   in the event of restarting of the hybrid vehicle by the driver after a previous special mode, the vehicle is again operated in the special mode when the internal combustion engine is switched on if it is established that an operating parameter of the electric drive, which comprises the electrical machine and the energy store, and is related to the operational capability of the electric drive satisfies a criterion for reduced operational capability of the electric drive, and
   in the event of restarting of the hybrid vehicle by the driver after the previous special mode, the vehicle is again operated in the purely electric mode when the internal combustion engine is switched on if it is established that the operating parameter of the electric drive which comprises the electrical machine and the energy store and is related to the operational capability of the electric drive does not satisfy the criterion for reduced operational capability of the electric drive.

18. The method as claimed in claim 1, wherein the hybrid vehicle is a plug-in hybrid vehicle.

19. A control device for controlling the operation of a hybrid vehicle having an internal combustion engine and an electrical machine for driving the hybrid vehicle, wherein the internal combustion engine is supplied with fuel from a fuel tank, wherein a fuel filling level of the fuel tank is determined using a fuel filling level sensor, wherein the electrical machine is supplied with electrical energy from an energy store, and the vehicle is configured to be driven in a purely electric mode, with the internal combustion engine switched off, using the electrical machine, wherein the control device is configured:
   to establish that the fuel filling level sensor indicates that a lower filling level has been reached or undershot, and,
   in response to establishing that the filling level has been reached or undershot, the control device is further configured to trigger switch off of the internal combustion engine and driving of the vehicle in the purely electric mode, with the internal combustion engine switched off, using the electrical machine,
   wherein, following the purely electric mode of the vehicle, the control device is configured to trigger switch on of the internal combustion engine and driving of the vehicle using the internal combustion engine in a special mode with the internal combustion engine switched on when one or more conditions for the special mode are satisfied.

* * * * *